United States Patent [19]

Tsumura et al.

[11] Patent Number: 5,484,854
[45] Date of Patent: Jan. 16, 1996

[54] MODIFIED PHENOLIC RESIN, EPOXY RESIN AND CURING AGENT MOLDING MATERIAL

[75] Inventors: Masahiro Tsumura; Masao Tashima; Hiromi Miyasita; Haruhiko Takeda; Tomoaki Fujii, all of Kamisu, Japan

[73] Assignee: Kashima Oil Co., Ltd., Tokyo, Japan

[21] Appl. No.: 417,779

[22] Filed: Apr. 6, 1995

Related U.S. Application Data

[62] Division of Ser. No. 190,899, Feb. 3, 1994, Pat. No. 5,432,240.

[30] Foreign Application Priority Data

| Feb. 5, 1993 | [JP] | Japan | 5-40646 |
| Jun. 18, 1993 | [JP] | Japan | 5-170914 |
| Jun. 28, 1993 | [JP] | Japan | 5-178483 |

[51] Int. Cl.$^6$ .......... C08L 61/10; C08L 63/02; C08L 63/04
[52] U.S. Cl. .......... 525/486; 525/481; 525/485; 525/488; 525/423
[58] Field of Search .......... 525/485, 486, 525/488, 481, 423, 398, 472

[56] References Cited

U.S. PATENT DOCUMENTS

| 3,301,803 | 1/1967 | Schick et al. | 527/503 |
| 3,398,107 | 8/1968 | Rowe, Jr. et al. | 525/472 |
| 4,024,094 | 5/1977 | Kurata et al. | 525/472 |

FOREIGN PATENT DOCUMENTS

| 31-3574 | 4/1939 | Japan | 525/472 |
| 61-235413 | 10/1986 | Japan . | |
| 1-6016 | 1/1989 | Japan . | |
| 2-229823 | 9/1990 | Japan . | |
| 2-274714 | 11/1990 | Japan . | |
| 3-247616 | 11/1991 | Japan . | |
| 4-42359 | 5/1992 | Japan . | |
| 4-145116 | 5/1992 | Japan . | |
| 4-250034 | 9/1992 | Japan . | |
| 4-348933 | 12/1992 | Japan . | |
| 5-16276 | 1/1993 | Japan . | |
| 5-271134 | 10/1993 | Japan . | |

*Primary Examiner*—Robert E. Sellers
*Attorney, Agent, or Firm*—Oblon, Spivak, McClelland, Maier & Neustadt

[57] ABSTRACT

A molding material useful in the fabrication of an electrical or electronic part comprises a modified phenolic resin (A), an epoxy resin (B) and a curing agent (C), said modified phenolic resin prepared by heating heavy oil or pitch and a formaldehyde in a molar ratio of formaldehyde: (oil or pitch) of from 1–15:1 in the presence of an acid catalyst, adding phenol in a molar ratio of phenol:(oil or pitch) of from 0.5–5:1 to form a modified phenolic resin, and purifying by performing in optional sequence (i) a treatment with an aliphatic or alicyclic hydrocarbon and (ii) an extraction with an aromatic hydrocarbon solvent wherein the catalyst has a solubility of 0.1 or less to remove the catalyst.

13 Claims, 2 Drawing Sheets

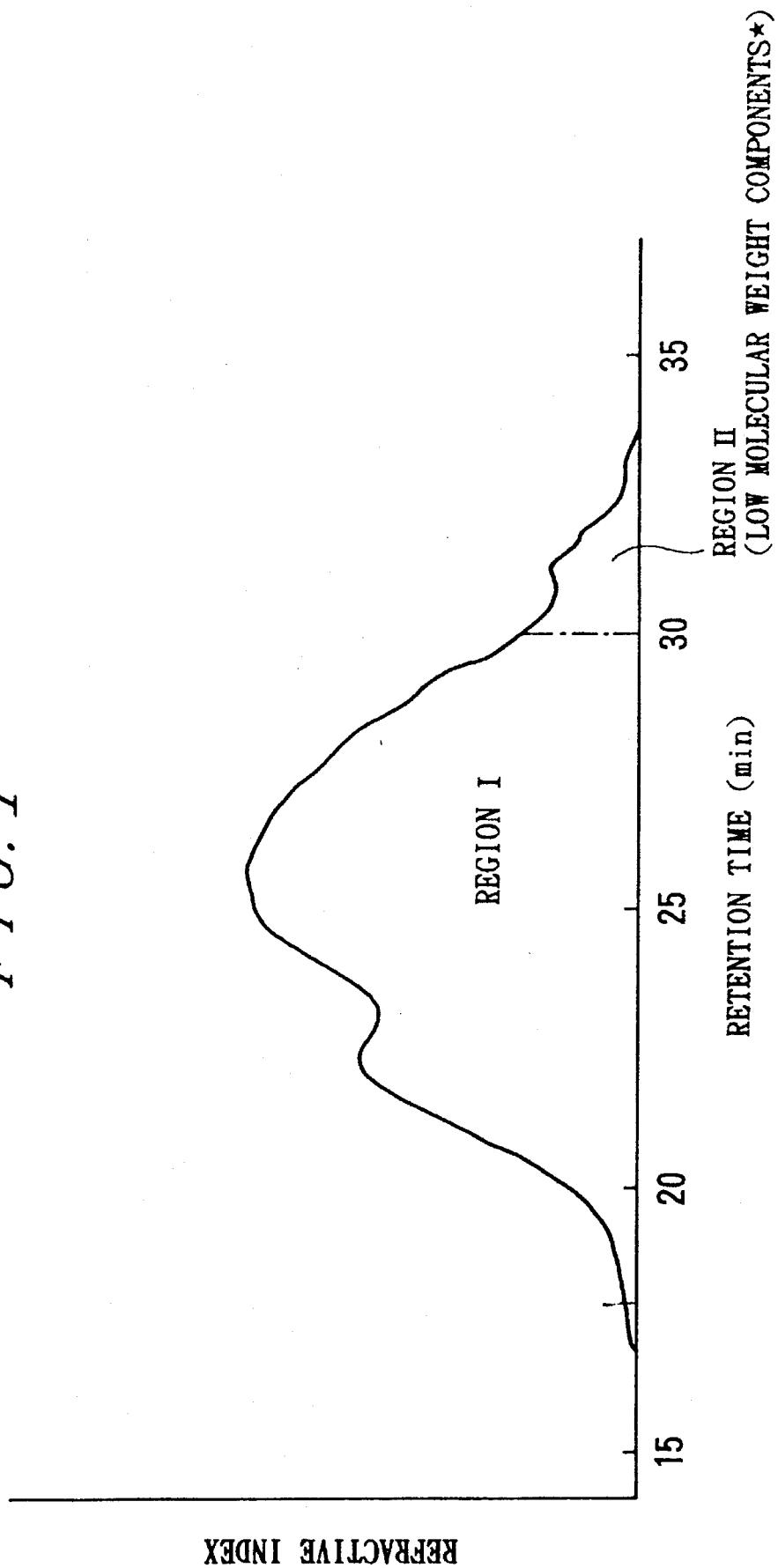

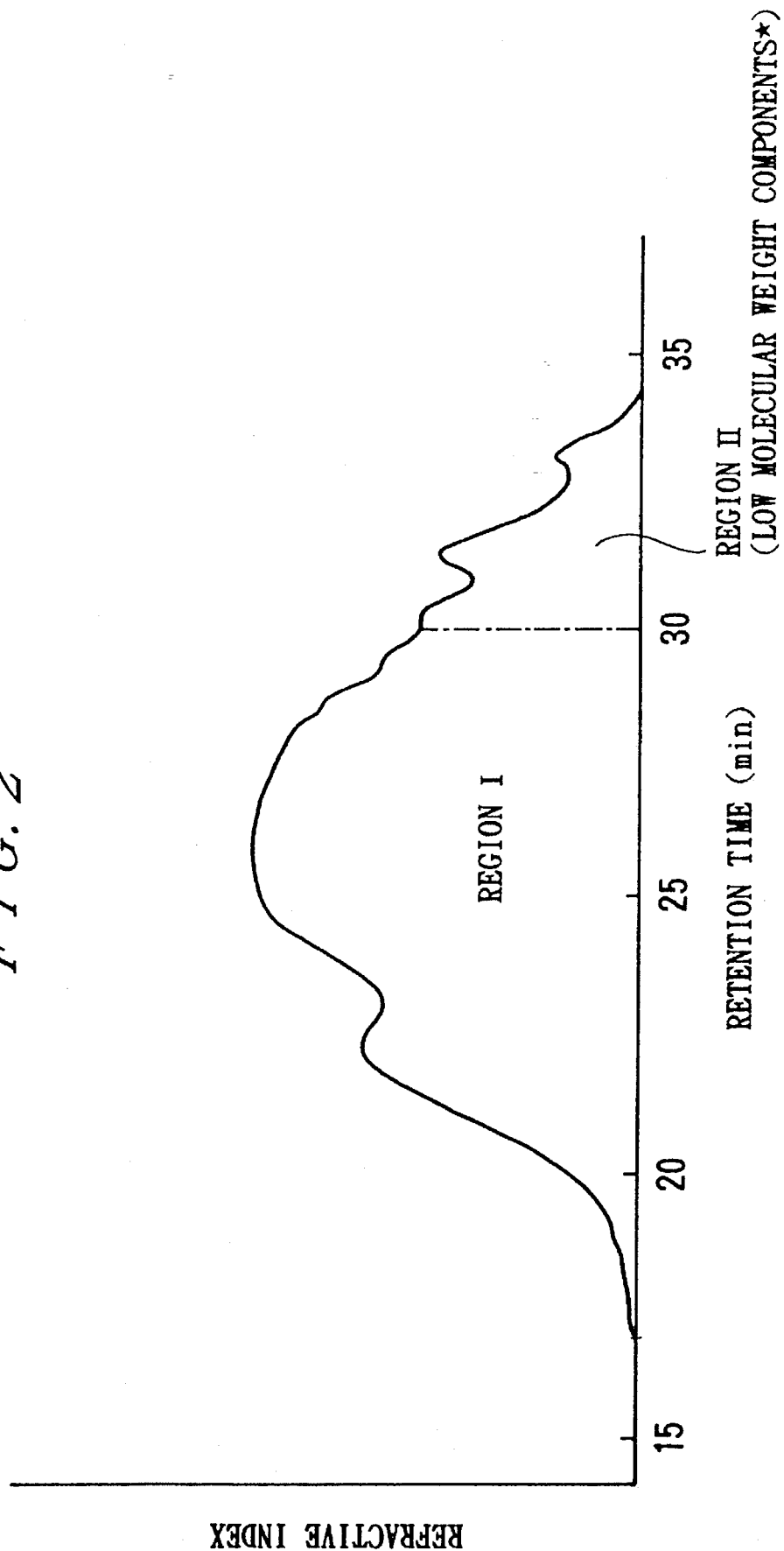

MODIFIED PHENOLIC RESIN, EPOXY RESIN AND CURING AGENT MOLDING MATERIAL

This is a divisional of application Ser. No. 08/190,899, filed Feb. 3, 1994, now U.S. Pat. No. 5,432,240

FIELD OF THE INVENTION

The present invention relates to a novel process for producing a modified phenolic resin, a molding material based on the modified phenolic resin, and a material for electrical or electronic part and a semiconductor sealer (sealing compound) each produced utilizing the molding material.

More particularly, the present invention is concerned with a process for producing a modified phenolic resin which contains substantially no acid so that it does not corrode metal and which can provide, in combination with an epoxy resin, a resin molding having excellent electrical insulating property and thermal and moisture resistances. Further, the present invention is concerned with a molding material based on the modified phenolic resin and a material for electrical or electronic part and a semiconductor sealer each produced utilizing the molding material.

BACKGROUND OF THE INVENTION

The phenolic resin provides a molding excellent in mechanical properties, and hence has widely been employed from of old either independently or in the form of a blend with another resin, such as an epoxy resin. However, the phenolic resin per se and blend thereof have drawbacks in that the light and alkali resistances are relatively low, that they are likely to absorb water or an alcohol to thereby suffer from changes in the dimension and electrical resistance, and that the thermal resistance, especially the oxidation resistance at high temperatures, thereof is poor.

In order to overcome the drawbacks, various modifications of the phenolic resin have been studied. For example, various modified phenolic resins have been proposed, which have improved resistances to deterioration and oxidation due to light, chemicals, etc. by virtue of the modification using fats and fatty oils, a rosin or a neutral aromatic compound.

Among the various proposals, Japanese Patent Application Laid-Open Publication No. 235413/1986 discloses a preparation of a phenol-modified aromatic hydrocarbon resin having excellent thermal resistance by selecting reactants thereof. However, the phenolic resin obtained by this method is disadvantageously not cured unless being maintained at a high temperature for a prolonged period of time in the manufacturing of a molding by the use thereof.

Japanese Patent Application Laid-Open Publication No. 274714/1990 discloses that a modified phenolic resin useful as a molding material, having excellent thermal and oxidation resistances and mechanical strength as cannot be expected from the conventional phenolic resin, is obtained by employing a petroleum heavy oil or a petroleum pitch, which is a cheap material, as a modifier material and by selecting specific reaction conditions.

Further, Japanese Patent Application Laid-Open Publication No. 145116/1992 discloses that, in the production of such a phenolic resin, a crude modified phenolic resin obtained by a polycondensation of starting compounds may be subjected to a neutralization treatment, a water washing treatment and/or an extraction treatment to thereby neutralize and remove any acid remaining in the crude modified phenolic resin, so that a modified phenolic resin which does not corrode a metal member in contact with the resin is provided.

In the above process for producing the modified phenolic resin, the acid remaining in the crude modified phenolic resin is actually neutralized and removed by the neutralization treatment using an amine, followed by the water washing treatment. However, the modified phenolic resin obtained through the purification step comprising the above neutralization and water washing treatments is likely to retain a neutralization product, so that there is a problem that it is unsatisfactory as a molding material for a product on which strict requirements for thermal and corrosion resistances are imposed, such as a molding material for an electrical or electronic part and a material for a semiconductor sealer.

In the above situation of the prior art, the inventors have made extensive and intensive studies. As a result, it has unexpectedly been found that a modified phenolic resin containing substantially no acid can be provided by purifying a crude modified phenolic resin obtained by polycondensation of starting compounds through a purification step comprising a characteristic extraction treatment.

Moreover, the inventors have found that a molding material based on a modified phenolic resin, which provides a molding having excellent thermal, moisture and corrosion resistances, can be obtained by the employment of the specific modified phenolic resin containing substantially no acid in combination with an epoxy resin. Based on these findings, the present invention has been completed.

OBJECT OF THE INVENTION

The present invention has been made in the above situation of the prior art. An object of the present invention is to provide a process for producing a modified phenolic resin which contains substantially no acid so that it does not corrode metal, and which can be formed into a molding having excellent electrical insulating property and thermal and moisture resistances.

It is another object of the present invention to provide a process for producing a modified phenolic resin which can be formed into a molding further improved in thermal resistance and having excellent dimensional stability in addition to the above properties.

It is a further object of the present invention to provide not only a molding material based on a modified phenolic resin, which comprises the modified phenolic resin containing substantially no acid, obtainable by the above process, and an epoxy resin, but also a material for electrical or electronic part and a semiconductor sealer each produced utilizing the molding material.

SUMMARY OF THE INVENTION

There is provided in one aspect of the present invention a process for producing a modified phenolic resin, comprising:

heating under agitation a mixture comprising a petroleum heavy oil or a petroleum pitch and a formaldehyde polymer in a ratio of the number of moles, in terms of formaldehyde, of the formaldehyde polymer to that of the petroleum heavy oil or pitch of 1 to 15 in the presence of an acid catalyst, gradually adding a phenol to the mixture while heating under agitation until a ratio of the number of moles of the phenol to that of the petroleum heavy oil or pitch of 0.5 to 5 to thereby effect a polycondensation of the petroleum heavy oil or pitch, the formaldehyde polymer and the phenol so that a crude modified phenolic resin is formed, and subjecting the crude modified phenolic resin to a purification step comprising the following purification treatments, performed in optional sequence, of:

(i) treating the crude modified phenolic resin with a solvent containing at least one compound selected from the group consisting of aliphatic and alicyclic hydrocarbons each having up to 10 carbon atoms to thereby remove solvent-soluble components including unreacted components, and (ii) treating the crude modified phenolic resin with an extraction solvent capable of dissolving most of the modified phenolic resin but dissolving the acid catalyst in a solubility of 0.1 or less to thereby extract the modified phenolic resin and remove catalyst residue, thereby obtaining a modified phenolic resin containing substantially no acid.

In the process for producing a modified phenolic resin according to the present invention, the purification step may comprise the above-mentioned purification treatment (i), the above-mentioned purification treatment (ii) and a purification treatment (iii) comprising treating the crude modified phenolic resin with a mixed solvent which is a mixture of an aromatic hydrocarbon and either an aliphatic hydrocarbon or an alcohol to thereby extract and remove solvent-soluble components including unreacted components and low molecular weight components, the above-mentioned purification treatments (i), (ii) and (iii) being performed in optional sequence.

In another aspect of the present invention, there is provided a first molding material based on a modified phenolic resin, comprising the modified phenolic resin (A) obtained by the above described process, an epoxy resin (B) and a curing agent (C).

In a further aspect of the present invention, there is provided a second molding material based on a modified phenolic resin, comprising a modified phenolic resin (A') which is obtained by reacting a petroleum heavy oil or a petroleum pitch, a formaldehyde polymer and a phenol in the presence of an acid catalyst to effect a polymerization, contains substantially no acid and has a content of low molecular weight components, each of which has a molecular weight of 600 or less in terms of polystyrene, of 10% or less, an epoxy resin (B) and a curing agent (C).

These molding materials based on a modified phenolic resin may further contain an inorganic filler (D).

In still a further aspect of the present invention, there are provided a material for electrical or electronic part and a semiconductor sealer each characterized by utilizing the above molding materials based on a modified phenolic resin.

BRIEF DESCRIPTION OF THE DRAWINGS

FIG. 1 is a chromatogram showing the molecular weight distribution of the modified phenolic resin (Sample 2) produced in Example 8, which was obtained by GPC; and FIG. 2 is a chromatogram showing the molecular weight distribution of the modified phenolic resin (Sample A) produced in Example 8, which was obtained by GPC.

DETAILED DESCRIPTION OF THE INVENTION

Hereinbelow, the present invention will be described in greater detail.

In the process for producing the modified phenolic resin according to the present invention, a crude modified phenolic resin obtained by a specific polycondensation step is purified by a specific purification step.

In the present invention, more particularly, the polycondensation step comprises heating under agitation a mixture comprising a petroleum heavy oil or a petroleum pitch and a formaldehyde polymer in a specific ratio in the presence of an acid catalyst, and gradually adding a predetermined amount of a phenol to the mixture while heating under agitation to thereby produce a crude modified phenolic resin.

The petroleum heavy oil or pitch used as a raw material for producing the crude modified phenolic resin includes a distillation residue, a hydrocracking residue and a catalytic cracking residue of crude oil, a thermal cracking residue of naphtha or LPG, and a vacuum distillate, an extract by solvent extraction and a thermal treatment product from such residues. From these, a petroleum heavy oil or pitch having appropriate fa and Ha values is preferably selected and used.

It is preferred that the petroleum heavy oil or pitch have a ratio of aromatic hydrocarbon (fa) ranging from 0.40 to 0.95, especially from 0.5 to 0.8, still especially from 0.55 to 0.75 and have a ratio of hydrogen of aromatic ring (Ha) ranging from 20 to 80%, especially from 25 to 60%, still especially from 25 to 50%.

The ratio of aromatic hydrocarbon (fa) and the ratio of hydrogen of aromatic ring (Ha) are calculated by the following formulae from the data obtained by $^{13}C$—NMR and $^{1}H$—NMR measurements of the petroleum heavy oil or pitch.

$$fa \text{ value} = \frac{\text{number of aromatic carbons in oil or pitch}}{\text{number of all carbons in oil or pitch}}$$

$$Ha \text{ value} = \frac{\text{number of hydrogens of aromatic rings in oil or pitch}}{\text{number of all hydrogens in oil or pitch}} \times 100(\%)$$

When the fa value of the petroleum heavy oil or pitch as a raw material is small, the aromatic content comes to small and, therefore, it is likely that the effect thereof on the improvement of the performance, such as thermal and oxidation resistances, of the resultant modified phenolic resin is lowered. Especially, when the fa value is less than 0.4, the above-mentioned improvement effect may be unfavorably extremely small.

On the other hand, when the petroleum heavy oil or pitch has an fa value of greater than 0.95, the reactivity of hydrogens of aromatic rings with formaldehyde is likely to become unfavorably low.

When the Ha value of the petroleum heavy oil or pitch as a raw material is smaller than 20%, the amount of aromatic ring hydrogens reacting with formaldehyde is less to thereby cause a reactivity lowering, so that the effect thereof on the improvement of the performance of the phenolic resin is likely to become poor.

On the other hand, when a petroleum heavy oil or pitch having an Ha value of greater than 80% is used as a raw material, the strength of the modified phenolic resin is likely to become poor.

With respect to the hydrocarbon composing the petroleum heavy oil or pitch used in the present invention, the number of condensed rings is not particularly limited. However, it is generally preferred that the petroleum heavy oil or pitch be mainly composed of polycyclic hydrocarbons each having 2 to 4 condensed rings. When the petroleum heavy oil or pitch is mainly composed of polycyclic hydrocarbons each having at least 5 condensed rings, such polycyclic hydrocarbons have generally high boiling points, e.g., higher than 450° C., so that boiling point variances is likely to become large among raw materials to thereby cause the stabilization of the quality of the product to be difficult. On the other hand, when the petroleous heavy oil or pitch is mainly composed of monocyclic hydrocarbons, the reactivity with formaldehyde may be so low that the effect thereof on the improvement of the quality of the resultant phenolic resin comes to poor.

The formaldehyde polymer used as a raw material in combination with the petroleum heavy oil or pitch in the present invention includes, for example, linear polymers, such as paraformaldehyde and polyoxymethylene (especially, oligomer), and cyclic polymers, such as trioxane.

In the present invention, in producing a crude modified phenolic resin, the petroleum heavy oil or pitch is mixed with the formaldehyde polymer in a ratio of the number of moles, in terms of formaldehyde, of the formaldehyde polymer to the number of moles, calculated from the average molecular weight thereof, of the petroleum heavy oil or pitch of generally from 1 to 15, preferably from 2 to 12, and still preferably from 3 to 11.

When the above mixing ratio of the formaldehyde polymer to the petroleum heavy oil or pitch is less than 1, the strength of a cured molding from the resultant modified phenolic resin would be unfavorably low. On the other hand, when the above-mentioned mixing ratio is greater than 15, the properties and yields of obtained cured moldings would no longer vary, so that the use of the formaldehyde polymer in the ratio greater than 15 would be useless.

In the present invention, the mixture of the petroleum heavy oil or pitch and the formaldehyde polymer is heated under agitation in the presence of an acid catalyst. Bronsted and Lewis acids may be used as such an acid catalyst. Bronsted acid is preferred. Examples of Bronsted acids include toluenesulfonic acid, xylenesulfonic acid, hydrochloric acid, sulfuric acid and formic acid. Of these, p-toluenesulfonic acid and hydrochloric acid are particularly preferred.

The above acid catalyst is preferably used in an amount of 0.1 to 30% by weight, still preferably 1 to 20% by weight, relative to the weight of the total of the petroleum heavy oil or pitch, the formaldehyde polymer and the phenol described below.

When the amount of the acid catalyst is too small, it is likely that the reaction time is unfavorably long, and that a satisfactory reaction cannot be attained unless the reaction temperature is elevated. On the other hand, when the amount of the acid catalyst is too large, the reaction rate is no longer increased in proportion to the amount thereof, so that a disadvantage in view of cost is likely to be incurred.

In the step of producing the crude modified phenolic resin according to the present invention, a phenol is gradually added to the mixture of the petroleum heavy oil or pitch and the formaldehyde polymer while being heated under agitation in the presence of the acid catalyst.

Examples of such phenols include phenolic compounds, such as phenol, cresol, xylenol, resorcinol, bisphenol A and bisphenol F.

These may be used individually or in combination. The above phenol is added until a ratio of the number of moles of the phenol to the number of moles, calculated from the average molecular weight thereof, of the petroleum heavy oil or pitch of preferably 0.3 to 5, more preferably from 0.5 to 3.

When the ratio is less than 0.3, the reactivity between the petroleum heavy oil or pitch and the formaldehyde is lower than that between the phenol and the formaldehyde, so that it may occur that a satisfactory crosslinking density cannot be attained to thereby cause the strength of a cured molding to be poor as compared with that of the conventional phenolic resin. In particular, it is likely for the cured molding to exhibit unfavorably low impact resistance and hence brittleness. On the other hand, when the phenol is added in a ratio greater than 5, it is likely that the effect of the modification of the phenolic resin on the quality improvement is decreased.

It is preferred that the phenol is gradually added by dropping or other methods at a rate of 0.05 to 5 wt. %/min, preferably 0.1 to 2 wt. %/min, relative to the weight of the total of the reaction mixture.

When the addition rate is less than 0.05 wt. %/min, the time required for the addition may be too long, thereby increasing cost. On the other hand, when the addition rate exceeds 5 wt. %/min, it is likely that the added phenol so rapidly reacts with free formaldehyde and, therefore, it comes to difficult to form a homogeneous mixture or condensate.

The reason for heterogeneity would be that the reactivity of formaldehyde is much greater with the phenol than with the petroleum heavy oil or pitch, so that, unless the initial concentration of the phenol is kept low, formaldehyde undergoes a selective reaction with the phenol or a phenol-formaldehyde condensate formed by reaction to thereby bring about matter sparingly soluble in the system.

In the present invention, the time at which the phenol is added to the mixture of the petroleum heavy oil or pitch and the formaldehyde polymer is not particularly limited. However, it is preferred that the gradual addition of the phenol be initiated in a period of from a time at which the conversion of formaldehyde, estimated from the amount of remaining free formaldehyde, is substantially 0% to a time at which the conversion of formaldehyde is 70% or less, especially 50% or less.

When the conversion of formaldehyde exceeds 70%, the amount of formaldehyde capable of reacting with the added phenol is less, so that the performance of the resultant modified phenolic resin is likely to be deteriorated.

With respect to the heating and agitation of the mixture of the petroleum heavy oil or pitch and the formaldehyde polymer in the presence of the acid catalyst, the reaction temperature and time are determined, depending on the raw material formulation, the rate of addition of the phenol and the properties of the obtained resin. Naturally, the reaction temperature and the reaction time are mutually affecting factors. The heating under agitation of the above raw material mixture in the presence of the acid catalyst may preferably be conducted at 50° to 160° C., especially 60° to 120° C. for 0.5 to 10 hrs, especially 1 to 5 hrs.

When the production of the modified phenolic resin of the present invention is conducted by a batch process, the reaction can be performed in one stage, which is advantageous. Further, when the above production is conducted by a continuous process, it is not necessary to use an apparatus having been employed in the production of the conventional modified phenolic resin, in which a plurality of reaction products must continuously be mixed in respective predetermined proportions and thus difficult control is inevitable. Instead, the continuous production can be performed by disposing a complete mixing type reactor vessel in the middle and introducing the phenol to be added thereinto at a predetermined rate. This allows an apparatus cost to be relatively low, and ensures good operability.

In the present invention, the polycondensation reaction of the petroleum heavy oil or pitch, the formaldehyde polymer and the phenol can be performed in the absence of a solvent. However, an appropriate solvent may be used to lower the viscosity of the reaction mixture (reaction system) so that uniform reaction is ensured.

Examples of such solvents include aromatic hydrocarbons, such as benzene, toluene and xylene; halogenated aromatic hydrocarbons, such as chlorobenzene; nitro-substituted aromatic hydrocarbons, such as nitrobenzene; nitro-substituted aliphatic hydrocarbons, such as nitroethane and nitropropane; and halogenated aliphatic hydrocarbons, such as tetrachloroethylene, trichloroethylene and carbon tetrachloride.

In the process for producing the modified phenolic resin according to the present invention, the crude modified phenolic resin obtained by the above described polycondensation step is purified by the following specific purification step.

In the purification step for purifying the crude modified phenolic resin according to the present invention, purification treatment (i) in which the crude modified phenolic resin is treated to effect precipitation with a specific solvent to thereby remove solvent-soluble components including unreacted components, and purification treatment (ii) in which the crude modified phenolic resin is dissolved in a specific solvent to thereby extract the modified phenolic resin and remove catalyst residue, are performed in optional sequence.

Now, the purification treatments (i) and (ii) will be described in greater detail.

Purification Treatment (i)

In this treatment, components contained in the petroleum heavy oil or pitch as a raw material, which have low reactivity so as to remain in the crude modified phenolic resin in the unreacted or incompletely reacted state, and the solvent used in the polycondensation reaction, are removed.

The purification treatment (i) may be accomplished by putting the crude modified phenolic resin, at any time after the production thereof, in a solvent containing at least one compound selected from the group consisting of aliphatic and alicyclic hydrocarbons each having up to 10 carbon atoms to thereby precipitate the principal component of the resin and remove components soluble in the solvent, i.e., those unreacted and those remaining due to incomplete reaction and the solvent used in the reaction for producing the crude modified phenolic resin.

Aliphatic and alicyclic hydrocarbons, such as pentane, hexane, heptane and cyclohexane, are used as such a hydrocarbon solvent for purification. n-Hexane is particularly preferred.

Purification Treatment (ii)

In this treatment, catalyst residue, such as an acid, remaining in the crude modified phenolic resin is removed, thereby producing a modified phenolic resin containing substantially no acid. When the catalyst residue remains in the modified phenolic resin, a metal member in contact with this resin or a molding member comprising the resin is likely to suffer from corrosion to thereby cause the final product to have poor thermal and moisture resistances.

The terminology "containing substantially no acid" used herein means that either an acid or the like is completely absent, or an extremely small amount thereof remains which however does not exhibit any significant corrosive action to metal members.

The purification treatment (ii) may be accomplished by treating the crude modified phenolic resin with an extraction solvent capable of dissolving most of the modified phenolic resin but dissolving the acid catalyst used in the polycondensation of the raw materials in a solubility of 0.1 or less to thereby extract the modified phenolic resin and remove catalyst residue.

The extraction solvent is not particularly limited as long as the above is accomplished, which may, however, preferably be selected from aromatic hydrocarbons, such as benzene, toluene and xylene. Of these, toluene is particularly preferred.

In the purification treatment (ii) of the present invention, temperature and other conditions are not particularly limited as long as the above performance of the extraction solvent is fully exhibited. The crude modified phenolic resin may be put in the extraction solvent, or alternatively the extraction solvent may be added to the crude modified phenolic resin. Thus, the purification treatment (ii) can be accomplished readily and simply.

The modified phenolic resin containing substantially no acid, obtained by the purification treatment (ii), is generally in the form of a varnish having the resin dissolved in the solvent. The modified phenolic resin in the form of a varnish, if it is a final purified product, may be used as it is as a molding material, etc. Alternatively, it may be put in a solvent in which the modified phenolic resin is insoluble, such as n-hexane, to effect precipitation to thereby obtain powder of the modified phenolic resin prior to utilization.

Most of the catalyst residue remaining in the crude modified phenolic resin is removed by the purification treatment (ii). If desired, however, the modified phenolic resin may be further subjected to a neutralization treatment and/or a water washing treatment to thereby effect further removal of the catalyst residue, such as an acid, in the resin.

The neutralization treatment may be performed by adding a basic substance to the modified phenolic resin. Examples of such basic substances include alkali metal and alkaline earth metal hydroxides, such as sodium, potassium, calcium and magnesium hydroxides, ammonia, diethylenetriamine, triethylenetetramine, aniline and phenylenediamine.

The water washing treatment and the neutralization treatment can be carried out at any time in the purification step. The water washing treatment and the neutralization treatment is preferably carried out after the purification treatment (ii).

In the purification step to be performed in the present invention, the purification treatments (i) and (ii) may be carried out in optional sequence. However, when the modified phenolic resin in the form of a varnish is obtained as a final product, it is preferred that the purification treatment (i) be performed prior to the purification treatment (ii), from the viewpoint that the entire purification step is simplified.

Moreover, in the process for producing the modified phenolic resin according to the present invention, the purification step may further contain, in addition to the above described purification treatments (i) and (ii), a purification treatment (iii) in order to improve reactivity to an epoxy resin and dimensional stability and thermal resistance of moldings formed from the material containing the modified phenol resin and the epoxy resin. The purification treatment (iii) comprises treating the crude modified phenolic resin with a specific mixed solvent to thereby extract and remove solvent-soluble components containing unreacted components and low molecular weight components. Below, the purification treatment (iii) will be described in greater detail.

Purification Treatment (iii)

In this treatment, low molecular weight components contained in the crude modified phenolic resin are removed, this being accompanied by extraction and removal of unreacted components.

The purification treatment (iii) may be performed by putting the crude modified phenolic resin in a mixed solvent which is a mixture of an aromatic hydrocarbon and either an aliphatic hydrocarbon or an alcohol.

Benzene, toluene, xylene, etc. may be used as such an aromatic hydrocarbon. Toluene is especially preferred. The aliphatic hydrocarbon used in combination with the aromatic hydrocarbon includes, for example, pentane, n-hexane and heptane. n-Hexane is especially preferred. Examples of alcohols include methanol, ethanol and isopropanol. Methanol is especially preferred.

With respect to the aromatic hydrocarbon and the aliphatic hydrocarbon or alcohol for composing the mixed solvent for use in the purification treatment (iii), the combination and mixing ratio may appropriately be determined, depending on the molecular weights and amount of low molecular weight components to be extracted and removed.

Among various mixed solvents, a mixture of toluene and n-hexane and a mixture of toluene and methanol are especially preferred.

The mixed solvent may be prepared by mixing, for example, 100 to 300 parts by weight of the aromatic hydrocarbon with 150 to 600 parts by weight of the aliphatic hydrocarbon or the alcohol.

In the purification treatment (iii), the incorporation of the crude modified phenolic resin into the mixed solvent may be performed by various procedure which is not particularly limited. For example, a preferred procedure comprises dissolving the crude modified phenolic resin in an aromatic hydrocarbon to obtain a resin solution having a predetermined concentration, e.g., from 10 to 60% by weight, preferably from 20 to 50% by weight, and putting the resin solution into a predetermined amount of an aliphatic hydrocarbon or an alcohol, followed by agitation, so that the crude modified phenolic resin is incorporated in the mixed solvent of a predetermined formulation.

From the crude modified phenolic resin incorporated in the mixed solvent, low molecular weight components and unreacted components are dissolved in the solvent to effect separation thereof. The modified phenolic resin free from the low molecular weight components, etc. can be recovered by various techniques, such as filtration and vacuum drying.

The removal of the low molecular weight components improves the thermal resistance and dimensional stability of a molding from the thus obtained modified phenolic resin, especially a molding obtained from the same in combination with an epoxy resin. However, the amount of removed low molecular weight components is relevant to the yield of the final product, so that it is appropriately determined, taking into account the properties which a molding produced using the modified phenolic resin must have, cost, etc.

In the purification step of the present invention, the purification treatments (i), (ii) and (iii) may be carried out in optional sequence.

For example, the purification step for purifying the crude modified phenolic resin according to the present invention, carried out after the polymerization thereof, may comprise sequentially conducted purification treatment (iii) in which low molecular weight components and unreacted components are extracted and removed, purification treatment (ii) in which catalyst residue, such as an acid, is removed, and purification treatment (i) in which further removal of unreacted components and precipitation of the resin are carried out.

Further, the purification step according to the present invention, carried out after the polymerization of the modified phenolic resin, may comprise sequentially conducted purification treatment (i) in which removal of unreacted components and precipitation of the resin are carried out, purification treatment (ii) in which catalyst residue, such as an acid, is removed, and purification treatment (iii) in which low molecular weight components are extracted and removed.

Still further, the purification step according to the present invention, carried out after the polymerization of the modified phenolic resin, may comprise sequentially conducted purification treatment (i) in which removal of unreacted components and precipitation of the resin are carried out, purification treatment (ii) in which catalyst residue, such as an acid, is removed, purification treatment (i) in which removal of unreacted components and precipitation of the resin are carried out again, and purification treatment (iii) in which low molecular weight components are extracted and removed.

Still further, the purification step according to the present invention, carried out after the polymerization of the modified phenolic resin, may comprise simultaneously conducted purification treatments (i), (ii) and (iii) in which removals of unreacted components, catalyst residue, such as an acid, and low molecular weight components are simultaneously carried out.

By the above described process of the present invention, a modified phenolic resin can be obtained which contains substantially no acid, and which has a content of low molecular weight components, each of which has a molecular weight of 600 or less in terms of polystyrene as measured by GPC (gel permeation chromatography), as small as 10% or less, preferably 8% or less.

The modified phenolic resin containing substantially no acid does not corrode metal, and can provide, in combination with an epoxy resin, a molding having excellent moldability and thermal and moisture resistances.

The modified phenolic resin containing substantially no acid, having a relatively low content of low molecular weight components and a narrow molecular weight distribution, not only does not corrode metal but also has high reactivity with an epoxy resin, so that a molding further improved in thermal resistance and dimensional stability can be produced in combination with an epoxy resin, etc.

The thermal resistance and dimensional stability of the molding is remarkably improved when the modified phenolic resin having a content of low molecular weight components, each of which has a molecular weight of 600 or less in terms of polystyrene as measured by GPC, as small as 10% or less, preferably 8% or less, is used in combination with an epoxy resin, etc.

The molding material based on a modified phenolic resin according to the present invention comprises an epoxy resin (B) and a curing agent (C) together with the modified phenolic resin. The modified phenolic resin may be selected from the modified phenolic resin (A) produced by the above process according to the present invention and the modified phenolic resin (A') containing substantially no acid and having a content of low molecular weight components, each of which has a molecular weight of 600 or less in terms of polystyrene, of 600 or less, of 10% or less, said modified phenolic resin being obtained by reacting a petroleum heavy oil or a pitch, a formaldehyde polymer and a phenol in the presence of an acid catalyst to effect a polymerization.

In the molding material based on a modified phenolic resin comprising an epoxy resin, when the modified phenolic resin has a content of low molecular weight components, each of which has a molecular weight of 600 or less in terms of polystyrene, of more than 10%, the reactivity between the modified phenolic resin and the epoxy resin is apt to be low and, therefore, the resultant molding comprising the resins in combination is likely to have slightly poor thermal resistance and dimensional stability.

The epoxy resin used in combination with the modified phenolic resin (A) or (A') for producing the molding material based on a modified phenolic resin according to the present invention, generally exhibits less molding shrinkage, excellent thermal, abrasion and chemical resistances, and high electrical insulating property.

Various epoxy resins are available, which include, for example, glycidyl ether, glycidyl ester, glycidylamine, mixed and alicyclic epoxy resins.

In particular, examples of glycidyl ether (based on phenol) epoxy resins include bisphenol A, biphenyl, bisphenol F, tetrabromobisphenol A, tetraphenylolethane, phenolic novolak and o-cresol novolak epoxy resins.

Examples of glycidyl ether (based on alcohol) epoxy resins include polypropylene glycol and hydrogenated bisphenol A epoxy resins.

Examples of glycidyl ester epoxy resins include hexahydrophthalic anhydride and dimer acid epoxy resins.

Examples of glycidylamine epoxy resins include diaminodiphenylmethane, isocyanuric acid and hydantoinic acid epoxy resins.

Examples of mixed epoxy resins include p-aminophenol and p-oxybenzoic acid epoxy resins.

Of the above epoxy resins, bisphenol A, biphenyl, glycidylamine and phenolic novolak epoxy resins are preferred. The above epoxy resins may be used in combination.

The ratio at which the novel modified phenolic resin of the present invention is blended with the epoxy resin is not particularly limited. However, it is generally preferred that the modified phenolic resin be blended with the epoxy resin at a ratio of 10/90 to 90/10 by weight, especially 20/80 to 80/20 by weight.

When the above ratio is lower than 10/90 by weight, the effect of the modified phenolic resin of the present invention on the improvement of the thermal and moisture resistances of the obtained molding is not satisfactory. When the above ratio is higher than 90/10 by weight, the molding temperature is likely to be high.

Various conventional curing agents used for curing epoxy resins can be employed as a curing agent (C) to be incorporated in the molding material based on the modified phenolic resin according to the present invention. Examples of such curing agents include cyclic amines, aliphatic amines, polyamides, aromatic polyamines, acid anhydrides and catalytic curing agents.

In particular, examples of suitable cyclic amines include hexamethylenetetramine, and examples of suitable aliphatic amines include diethylenetriamine, triethylenetetramine, tetraethylenepentamine, diethylaminopropylamine, N-aminoethylpiperazine, isophoronediamine, bis(4-amino-3-methylcyclohexyl)methane and menthanediamine.

Examples of polyamides include condensates of a fatty acid from vegetable oil (dimer or trimer acid) and an aliphatic polyamine.

Examples of aromatic polyamines include m-phenylenediamine, 4,4'-diaminodiphenylmethane, 4,4'-diaminodiphenyl sulfone and m-xylylenediamine.

Examples of acid anhydrides include phthalic anhydride, tetrahydrophthalic anhydride, hexahydrophthalic anhydride, trimellitic anhydride, pyromellitic anhydride, benzophenonetetracarboxylic anhydride, chlorendic anhydride, dodecenylsuccinic anhydride, methyltetrahydrophthalic anhydride and methylendomethylenetetrahydrophthalic anhydride.

Examples of catalytic curing agents include Lewis acids, such as a complex of boron trifluoride and an amine, Lewis bases, such as tris (dimethylaminomethyl)-phenol, benzyldimethylamine, 2-ethyl-4-methylimidazole, 2-phenyl-4-methylimidazole, dicyandiamide and adipic dihydrazide, polymercaptan and polysulfide. The above curing agents may be used either individually or in combination.

The molding material based on the modified phenolic resin according to the present invention may contain an inorganic filler (D), in addition to the modified phenolic resin (A) or (A'), the epoxy resin (B) and the curing agent (C).

The strength and dimensional stability of the obtained molding can further be improved by the addition of the inorganic filler (D) to the molding material.

Various conventional inorganic fillers having been used as an inorganic filler or reinforcement for plastic materials may be used as the inorganic filler (D) in the present invention. Examples of such inorganic fillers include reinforcing fibers, such as glass, carbon, phosphor and boron fibers; hydrated metal oxides, such as aluminum and magnesium hydroxides; metal carbonates, such as magnesium and calcium carbonates; metal borates, such as magnesium borate; and inorganic reinforcements, such as silica and mica.

The amount of added inorganic filler (D) is not particularly limited. However, it is preferred that 20 to 600 parts by weight, especially 30 to 500 parts by weight of the inorganic filler be added per 100 parts by weight of the modified phenolic resin.

Moreover, if desired, the molding material based on the modified phenolic resin according to the present invention may further contain additives, including internal release agents, such as silicone and waxes, coupling agents, flame retarders, light stabilizers, antioxidants, pigments and extenders.

As described above, the molding material based on the modified phenolic resin according to the present invention comprises the modified phenolic resin (A) or (A'), the epoxy resin (B) and the curing agent (C), optionally further comprising the inorganic filler (D) and various additives, and used for forming various moldings.

In the present invention, the sequence in which the modified phenolic resin (A) or (A'), the epoxy resin (B) and the curing agent (C) are blended, is not particularly limited. For example, a powdery molding compound may be obtained by first blending a modified phenolic resin with an epoxy resin, secondly adding a curing agent to the blend, followed by effective kneading, and finally, if desired, adding an inorganic filler and additives. The time at which the inorganic filler and additives are added is not limited to the final stage, but any appropriate time may be selected.

The molding material based on the modified phenolic resin according to the present invention can be molded by various conventional molding means, including, for example, compression, injection, extrusion and transfer molding techniques.

In particular, when the molding material based on the modified phenolic resin according to the present invention is formed into a molding by transfer molding technique, such molding conditions are preferably selected that the molding temperature is in the range of from 120° to 180° C., the injection pressure is in the range of from 20 to 300 kgf/cm$^2$, the clamp pressure is in the range of from 50 to 250 kgf/cm$^2$ and the molding time is in the range of from 1 to 10 min. The resultant molding is preferably subjected to a postcure comprising heating at 150° to 300° C. for 0.5 to 24 hrs.

The postcure further improves the thermal resistance of the molding.

The molding obtained from the molding material based on the modified phenolic resin according to the present invention can have, for example, the following properties:

| Flexural strength | room temperature | 8–22 kgf/mm$^2$ |
|---|---|---|
| | 150° C. | 3–14 kgf/mm$^2$ |
| Flexural modulus | room temperature | 400–1800 kgf/mm$^2$ |
| | 150° C. | 200–1500 kgf/mm$^2$ |
| Tg (°C.) | | 130–260° C. |
| Thermal deformation temperature | | 190–300° C. or higher |
| Water absorption | ordinary state | 0.08–0.13 wt. % |
| | after boiling | 0.12–0.17 wt. % |
| Insulation resistance | ordinary state | $1.8 \times 10^{14}$–$5.0 \times 10^{14}$ Ω |
| | after boiling | $3.0 \times 10^{13}$–$2.0 \times 10^{14}$ Ω |

As described above, the molding material based on the modified phenolic resin according to the present invention does not corrode metal, and has excellent moldability to obtain a molding having excellent electrical insulating property and thermal and moisture resistances. The molding material based on the modified phenolic resin according to the present invention is advantageous in that not only the content of low molecular weight components is reduced to improve the reactivity between the modified phenolic resin and the epoxy resin, so that the dimensional stability and thermal resistance of the obtained molding can further be improved, but also the inorganic filler can be added to thereby further improve the mechanical strength and electrical insulating property of the molding. Therefore, the molding material based on the modified phenolic resin according to the present invention can suitably be employed to provide a material for electrical or electronic parts on which very strict requirements are imposed regarding the dimensional stability, thermal resistance and moldability.

Moreover, apart from the above properties, the molding material of the present invention is suitable for low pressure transfer molding now predominantly performed in molding of semiconductor sealers, so that it can very advantageously be utilized for a semiconductor sealer.

EFFECT OF THE INVENTION

In the process for producing the modified phenolic resin according to the present invention, the crude modified phenolic resin is purified by the purification step comprising the purification treatment (i) and the purification treatment (ii) performed in optional sequence, so that a modified phenolic resin containing substantially no acid can be provided which does not corrode metal, and which may be combined with an epoxy resin to obtain a molding having excellent electrical insulating property and thermal and moisture resistances.

Further, according to the process of the present invention, a modified phenolic resin having high reactivity with an epoxy resin so that it may be combined with the epoxy resin to provide a molding having further improved thermal resistance and dimensional stability, can be produced by further conducting the purification treatment (iii) in the purification step to thereby reduce low molecular weight components.

The molding material based on the modified phenolic resin according to the present invention comprises a modified phenolic resin containing substantially no acid, an epoxy resin and a curing agent, so that it does not corrode metal and has excellent moldability to obtain a molding having excellent thermal and moisture resistances. Thus, the molding material is suitable for providing not only a material for electrical or electronic parts on which very strict requirements are imposed regarding the thermal resistance and moldability but also a semiconductor sealer.

Still further, a molding having further improved dimensional stability and thermal resistance is provided by the use of the molding material based on a modified phenolic resin not only containing substantially no acid but also having a low content of low molecular weight components according to the present invention.

EXAMPLE

The present invention is further illustrated by the following Examples, which should not be construed as limiting the scope of the invention.

In the Examples and Comparative Examples, the measurement by GPC (gel permeation chromatography) of the content of low molecular weight components in the modified phenolic resin, the measurement of the glass transition temperature of the modified phenolic resin, and the measurements of the gelation time (gel time) and the linear expansion coefficient of the molding material were performed by the employment of the following equipment and conditions.

[Measurement of Content of Low Molecular Weight Components]

(1) Molecular Weight Distribution

Measured by GPC (gel permeation chromatography) by the employment of the following equipment and conditions:

Column: G3000H$_8$ (60 cm in column length) and G2000H$_8$ (60 cm in column length) manufactured by Toso Co., Ltd.; column temperature, 40° C.

Detector: differential refractometer; detection temperature, 40° C.

Eluting solution: chloroform; flow rate, 1.0 ml/min

Specimen: concentration, 20 mg/ml-chloroform; amount of injected specimen, 100 μl (2) Content of Low Molecular Weight Components Calculated by the following formula (1) on the basis of measurement results obtained by the above GPC.

$$\text{Content of low molecular weight components (\%)} = \frac{[\text{peak area for components having flowed out at or after a retention time of 30 min (corresponding to region II of each of FIGS. 1 and 2)}]}{[\text{All peak area for specimen (corresponding to regions I + II of each of FIGS. 1 and 2)}]} \times 100 \quad (1)$$

[Measurement of Glass Transition Temperature]

Method: dynamic viscoelasticity method

Instrument: DVE RHEOSPECTOLER model DVE-V4, manufactured by Rheology Co., Ltd.

Loading method: tensile method

Frequency for measurement: 10 Hz

Temperature elevation rate: 5° C./min

Displacement in dynamic measurement: $\pm 5 \times 10^{-4}$ cm

Test piece: 4 mm in width, 1 mm in thickness, 30 mm in span (From the grass transition temperature at which the physical properties of the specimen in the glass state is rapidly changed, the heat resistance of the specimen can be understood. The higher the grass transition temperature is, the more the specimen is excellent in the heat resistance.)
[Gelation Time]

Measured at 170° C. in accordance with Japanese Industrial Standard (JIS) K6910, with respect to a specimen from a compound having no filler added yet thereto.
(From the gelation time at which the sol of the resin change to the gel thereof, the reactivity to the epoxy resin can be understood. The shorter the gelation time is, the higher the reactivity of the resin to the epoxy resin is.)
[Measurement of Linear Expansion Coefficient]

Instrument: TAS-200 System, model TMA 8140C manufactured by Rigaku Co., Ltd.

Temperature elevation rate: 5° C./min

Length of test piece: 10 mm
(From the linear expansion coefficient of the specimen which indicates a ratio of an increase in length of the specimen by elevating the temperature, the dimensional stability can be understood. The lower the linear expansion coefficient, the more the dimensional stability of the specimen is excellent.)

In the following Examples and Comparative Examples, the parts are by weight, unless otherwise specified. The characteristics of stock oil (petroleum heavy oil) as a raw material for polycondensation are indicated in Table 1. The stock oil is one obtained by distilling bottom oil produced by fluid catalytic cracking (FCC) of vacuum gas oil.

TABLE 1

| Average molecular weight | 271 |
| Boiling point (°C.) | 241.5–466.5 |
| Ratio of aromatic hydrocarbon (fa) | 0.65 |
| Ratio of hydrogen of aromatic ring (Ha) (%) | 28 |

Note
(1) Average molecular weight: value measured according to the vapor pressure osmometry.
(2) Boiling point: value of °C. in terms of the atmospheric pressure measured according to ASTM D-1160.

(1) Average molecular weight: value measured according to the vapor pressure osmometry.

(2) Boiling point: value of °C. in terms of the atmospheric pressure measured according to ASTM D-1160.

Example 1
[Preparation of Modified Phenolic Resin]

334 g of the stock oil having the characteristics indicated in Table 1, 370 g of paraformaldehyde, 137 g of p-toluenesulfonic acid (monohydrate) and 678.5 g of p-xylene were charged into a glass reactor, and the temperature thereof was elevated to 95° C. under agitation. A preliminary reaction was performed at 95° C. for 1 hr. Then, 209 g of phenol was dropwise added at a rate of 1.3 g/min. After the completion of the addition of phenol, 5 agitation was continued for 15 min to effect reaction. Thereafter, the reaction mixture was poured into 5 liters of n-hexane to thereby precipitate a reaction product. The precipitate was separated from the unreacted components and solvent by filtration, and washed with 2.5 liters of n-hexane. The washed precipitate was dried to thereby obtain a modified phenolic resin.

The modified phenolic resin was dissolved in a 10-fold weight of toluene [solubility of p-toluenesulfonic acid (monohydrate) in toluene being not greater than 0.01], and insoluble matter mainly composed of p-toluenesulfonic acid was filtered off. The solution was concentrated to a resin concentration of 50% by weight. Thus, a varnish was obtained, and a small amount of triethylenetetramine was added thereto to effect neutralization. The resultant toluene varnish was put in a 5-fold weight of n-hexane to thereby re-precipitate a resin. Thus, 580 g of a modified phenolic resin was obtained. ps Example 2

60 Parts of a modified phenolic resin obtained in the same manner as in Example 1 and 40 parts of Epicoat 828 (bisphenol A epoxy resin, produced by Yuka Shell Epoxy Co., Ltd.) were kneaded together at 150° C. for 20 min, followed by cooling and pulverization. 2 Parts of 2-ethyl-4-methylimidazole (hereinafter referred to as "2E4MZ") as a catalytic curing agent was added, and the mixture was mixed by an automatic mortar for 20 min. Further, 150 parts of glass fiber (ES-30T, manufactured by Unitika UM Glass Co., Ltd.) as an inorganic filler was added, and mixed for 90 min by the automatic mortar. Thus, a compound (molding material) was obtained.

The resultant molding material was subjected to transfer molding conducted at 130° C. for 10 min, and postcured at 220° C. for 24 hrs to thereby obtain a molding based on the modified phenolic resin.

The properties thereof are shown in Table 2
Example 3

30 Parts of a modified phenolic resin obtained in the same manner as in Example 1 and 70 parts of Epicoat 1001 (bisphenol A epoxy resin, produced by Yuka Shell Epoxy Co., Ltd.) were kneaded together at 150° C. for 20 min, followed by cooling and pulverization. 2 Parts of 2E4MZ as a catalytic curing agent was added, and the mixture was mixed by an automatic mortar for 20 min. Further, 150 parts of glass fiber (ES-30T, manufactured by Unitika UM Glass Co., Ltd.) as an inorganic filler was added, and mixed for 90 min by the automatic mortar. Thus, a compound (molding material) was obtained.

The resultant molding material was molded at 150° C. for 5 min, and postcured at 220° C. for 12 hrs to thereby obtain a molding based on the modified phenolic resin.

The properties thereof are shown in Table 2.
Example 4

60 Parts of a modified phenolic resin obtained in the same manner as in Example 1 and 40 parts of Epicoat 152 (phenol novolak epoxy resin, produced by Yuka Shell Epoxy Co., Ltd.) were kneaded together at 150° C. for 20 min, followed by cooling and pulverization. 2 Parts of 2E4MZ as a catalytic curing agent was added, and the mixture was mixed by an automatic mortar for 20 min. Further, 150 parts of glass fiber (ES-30T, manufactured by Unitika UM Glass Co., Ltd. ) as an inorganic filler was added, and mixed for 90 min by the automatic mortar. Thus, a compound (molding material) was obtained.

The resultant molding material was molded at 130° C. for 10 min, and postcured at 220° C. for 24 hrs to thereby obtain a molding based on the modified phenolic resin.

The properties thereof are shown in Table 2. 5
Example

60 Parts of a modified phenolic resin obtained in the same manner as in Example 1 and 40 parts of Araldite MY- 9512 (glycidylaminic tetrafunctional epoxy resin, produced by Ciba Geigy (Japan), Ltd.) were kneaded together at 150 ° C. for 20 min, followed by cooling and pulverization. 2 Parts of 2E4MZ and 10 parts of diaminodiphenylmethane (hereinafter referred to as "DDM") as catalytic curing agents were added, and the mixture was mixed by an automatic mortar for 20 min. Further, 150 parts of glass fiber (ES-30T, manufactured by Unitika UM Glass Co., Ltd. ) as an inorganic filler was added, and mixed for 90 min by the automatic mortar. Thus, a compound (molding material) was obtained.

The resultant molding material was molded at 150° C. for 2 min, and postcured at 220° C. for 12 hr to thereby obtain a molding based on the modified phenolic resin.

The properties thereof are shown in Table 2.

The resultant molding material was molded at 170° C. for 2 min, and postcured at 200° C. for 12 hrs to thereby obtain a molding.

The properties thereof are shown in Table 2.

TABLE 2

|  | Ex. 2 | Ex. 3 | Ex. 4 | Ex. 5 | Ex. 6 | Ex. 7 |
|---|---|---|---|---|---|---|
| Density g/cm$^3$ | 1.790 | 1.787 | 1.785 | 1.780 | 1.243 | 1.896 |
| Flexural strength kgf/mm$^2$ | | | | | | |
| Room temperature | 18.6 | 20.3 | 13.7 | 21.3 | 8.2 | 10.5 |
| 150° C. | 9.4 | 5.9 | 10.9 | 13.4 | 3.6 | 7.6 |
| Flexural strength kgf/mm$^2$ | | | | | | |
| Room temperature | 1610 | 1580 | 1800 | 1800 | 410 | 1760 |
| 150° C. | 1060 | 590 | 1210 | 1480 | 200 | 1010 |
| Tg °C. | 219 | 137 | 207 | 262 | 262 | 207 |
| Thermal deformation temp. °C. | 300 ↑ | 300 ↑ | 300 ↑ | 300 ↑ | 193 | 300 ↑ |
| Water absorption wt. % | | | | | | |
| Ordinary state | 0.095 | 0.091 | 0.088 | 0.130 | — | 0.096 |
| After boiling | 0.125 | 0.132 | 0.128 | 0.169 | — | 0.146 |
| Insulation resistance Ω | | | | | | |
| Ordinary state | $2.4 \times 10^{14}$ | $1.8 \times 10^{14}$ | $5.0 \times 10^{14}$ | $2.0 \times 10^{14}$ | — | $5.1 \times 10^{14}$ |
| After boiling D 2/100 | $9.8 \times 10^{13}$ | $1.7 \times 10^{14}$ | $2.0 \times 10^{14}$ | $3.5 \times 10^{13}$ | — | $1.6 \times 10^{14}$ |

Note
Physical properties, other than Tg (glass transition temperature), were measured according to Japanese Industrial Standard (JIS) K6911.

Example 6

60 Parts of a modified phenolic resin obtained in the same manner as in Example 1 and 40 parts of Araldite MY- 9512 (glycidylaminic tetrafunctional epoxy resin, produced by Ciba Geigy (Japan), Ltd.) were kneaded together at 150 ° C. for 20 min, followed by cooling and pulverization. 2 Parts of 2E4MZ and 10 parts of DDM as catalytic curing agents were added, and the mixture was mixed by an automatic mortar for 20 min. Thus, a compound (molding material) was obtained.

The resultant molding material was molded at 130° C. for 10 min, and postcured at 220° C. for 24 hrs to thereby obtain a molding based on the modified phenolic resin.

The properties thereof are shown in Table 2.

Example 7

60 Parts of a modified phenolic resin obtained in the same manner as in Example 1 and 40 parts of Epicoat 828 (bisphenol A epoxy resin, produced by Yuka Shell Epoxy Co., Ltd.) were kneaded together at 150° C. for 20 min, followed by cooling and pulverization. 2 Parts of 2E4MZ as a catalytic curing agent and 1 part of coupling agent A-1100 (produced by Unitika Co., Ltd.) were added, and the mixture was mixed by an automatic mortar for 20 min. Further, 150 parts of silica as an inorganic filler was added, and mixed for 90 min by the automatic mortar. Thus, a compound (molding material) was obtained.

Example 8

334 g of the stock oil having the characteristics indicated in Table 1, 370 g of paraformaldehyde, 137 g of p-toluenesulfonic acid monohydrate and 678.5 g of p-xylene were charged into a glass reactor, and the temperature thereof was elevated to 95° C. under agitation. A preliminary reaction was performed at 95° C. for 1 hr. Then, 209 g of phenol was dropwise added at a rate of 1.3 g/min. After the completion of the addition of phenol, agitation was continued for 15 min to effect reaction. Thereafter, the reaction mixture was poured into 3,300 g (5 litters) of n-hexane to thereby precipitate a reaction product. The precipitate was separated from the unreacted components and solvent by filtration, and washed with 1,600 g (2.5 litters) of n-hexane. The washed precipitate was dried in vacuo to thereby obtain a modified phenolic resin containing an acid. 5 The modified phenolic resin was dissolved in a 10-fold weight of toluene [solubility of p-toluenesulfonic acid monohydrate in toluene being not greater than 0.01], and insoluble matter mainly composed of p-toluenesulfonic acid monohydrate was filtered off. The toluene solution of the resin was concentrated to a resin concentration of 50 % by weight. Then, a small amount of triethylenetetramine was added thereto to effect neutralization. Thus, a toluene solution of a modified phenolic resin containing no acid was obtained.

By mixing this toluene solution with toluene, 5 varieties of toluene solutions having different resin concentrations were prepared in different amounts, as indicated in Table 3. Each of the obtained solutions was put in the whole amount into the solvent for precipitation indicated in Table 3, agitated and filtered to thereby extract and remove low molecular weight components. The precipitate collected on each of the filter papers used in the filtration was dried in vacuo. Thus, novel modified phenolic resins (Sample Nos. 1 to 5) indicated in Table 3 were obtained.

The obtained novel modified phenolic resins (Sample Nos. 1 to 5) were subjected to GPC measurements described above. The contents of low molecular weight components calculated on the basis of GPC measurement results are indicated in Table 5, and chromatogram of Sample 2 obtained by the GPC is shown in FIG. 1 as a representative.

Further, each of the obtained novel modified phenolic resins (Sample Nos. 1 to 5) was blended with biphenyl epoxy resin [YX-4000 (trade name), produced by Yuka Shell Epoxy Co., Ltd. ] according to the below described procedure to thereby obtain a compound (molding material). The resultant molding material was subjected to transfer molding conducted at 175° C. for 90 sec, and postcured at 175 ° C. for 6 hrs to thereby obtain a molding.

The properties thereof are indicated in Table 5.

[Preparation of Compound]

100 Parts of the modified phenolic resin and 80 parts of the epoxy resin were melt kneaded at 120° C., cooled, and pulverized. The pulverized mixture was mixed with 3.67 parts of 2-ethyl-4-methylimidazole (reagent 1st grade, produced by Wako Pure Chemical Industries, Ltd.) and 1.48 parts of carnauba wax. Further, 555.5 parts of fused silica [CRS1102-RD8 (trade name), produced by Tatsumori Co., Ltd.] was added as a filler, and mixed to thereby obtain a compound.

TABLE 3

| Sample No. | Prepared toluene solution of resin | | Solvent for precipitation | | Resin yield (g) |
|---|---|---|---|---|---|
| | Resin concentration (wt. %) | Amount of solution (g) | Type of solvent | Amount of solvent (g) | |
| Example 8 | | | | | |
| Sample 1 | 30 | 167 | n-hexane | 193 | 43 |
| Sample 2 | 25 | 200 | n-hexane | 210 | 39 |
| Sample 3 | 20 | 250 | n-hexane | 170 | 34 |
| Sample 4 | 20 | 250 | methanol | 200 | 42 |
| Sample 5 | 15 | 333 | methanol | 189 | 37 |

Further, a toluene solution containing a modified phenolic resin containing no acid, having not yet been subjected to treatment with the mixed solvent, in a concentration of 50% by weight was prepared by the same procedure as described above.

This toluene solution was poured into a 3.3-fold weight of n-hexane to precipitate the resin, and filtered. The precipitate was dried in vacua, thereby obtaining 580 g of a modified phenolic resin containing no acid (Sample A).

The obtained modified phenolic resin containing no acid was subjected to GPC measurements as described above. Chromatogram obtained by the GPC is shown in FIG. 2. The content of low molecular weight components calculated on the basis of GPC measurement results as described above was 14.1% as shown in Table 5.

Further, as described above, the obtained modified phenolic resin containing no acid (Sample A) was blended with the epoxy resin to thereby obtain a compound, which was molded into a molding. The gelation time and the properties of the molding were measured.

The results are shown in Table 5.

Example 9

850 g of toluene was added to the reaction mixture obtained in the same manner as in Example 8, mixed, and cooled to 60° C. The whole amount of the cooled mixture was poured into 3,300 g (5 litters) of n-hexane, agitated and filtered to extract and remove the unreacted components and the low molecular weight components of the resin. The precipitate collected on a filter paper was washed with 1,600 g (2.5 litters) of n-hexane, and dried in vacuo to thereby obtain a novel modified phenolic resin containing an acid.

The modified phenolic resin was dissolved in a 10-fold weight of toluene, and insoluble matter mainly composed of p-toluenesulfonic acid monohydrate was filtered off. The toluene solution of the resin was concentrated to a resin concentration of 50% by weight. Then, a small amount of triethylenetetramine was added thereto to effect neutralization. The resultant toluene solution was poured into a 3.3-fold weight of n-hexane to thereby precipitate the resin, and filtered. The precipitate was dried in vacuo, thereby obtaining 490 g of a novel modified phenolic resins (Sample 6).

The content of low molecular weight components, the gelation time and the properties of a molding were measured as in Example 8. The results are shown in Table 5.

Example 5

By dissolving the modified phenolic resin containing no acid, obtained in Example 8, in toluene, 2 varieties of toluene solutions having different resin concentrations were prepared in different amounts, as indicated in Table 4. Each of the obtained solutions was put in the whole amount into the solvent for precipitation indicated in Table 4, agitated and filtered to thereby extract and remove low molecular weight components. The precipitate collected on each of the filter papers used in the filtration was dried in vacuo. Thus, novel modified phenolic resins (Samples 7 and 8) shown in Table 4 were obtained in indicated yields.

Moreover, as in Example 8, the content of low molecular weight components, the gelation time and the properties of a molding were measured for each of the modified phenolic resins. The results are shown in Table 5.

TABLE 4

| Sample No. | Prepared toluene solution of resin | | Solvent for precipitation | | Resin yield (g) |
|---|---|---|---|---|---|
| | Resin concentration (wt. %) | Amount of solution (g) | Type of solvent | Amount of solvent (g) | |
| Example 10 | | | | | |
| Sample 7 | 30 | 167 | n-hexane | 273 | 42 |
| Sample 8 | 20 | 250 | methanol | 285 | 41 |

TABLE 5

| Sample No. | Content of low molecular weight components (%) | Gelation time (sec) | Properties of molding | |
|---|---|---|---|---|
| | | | Glass transition temp. (°C.) | Linear expansion coefficient ($10^{-5}$/°C.) |
| Example 8 | | | | |
| Sample A | 14.1 | 300 | 139 | 2.35 |
| Sample 1 | 9.6 | 160 | 147 | 2.01 |
| Sample 2 | 6.6 | 143 | 152 | 1.87 |
| Sample 3 | 4.3 | 100 | 156 | 1.78 |
| Sample 4 | 8.0 | 125 | 148 | 1.93 |

TABLE 5-continued

| Sample No. | Content of low molecular weight components (%) | Gelation time (sec) | Properties of molding | |
|---|---|---|---|---|
| | | | Glass transition temp. (°C.) | Linear expansion coefficient ($10^{-5}$/°C.) |
| Sample 5 Example 9 | 5.5 | 86 | 154 | 1.79 |
| Sample 6 Example 10 | 7.7 | 152 | 148 | 1.92 |
| Sample 7 | 6.4 | 138 | 151 | 1.86 |
| Sample 8 Example 11 | 5.8 | 84 | 152 | 1.86 |
| Sample 9 | 7.5 | 131 | 148 | 1.90 |

Example 11

1250 g of toluene was added to the reaction mixture obtained in the same manner as in Example 8, mixed, and cooled to 60° C. The whole amount of the cooled mixture was poured into 3,300 g (5 litters) of methanol, agitated and filtered to extract and remove the unreacted components, the low molecular weight components of the resin and most of the p-toluenesulfonic acid monohydrate. The precipitate collected on a filter paper was washed with 1600 g (2.5 litters) of methanol, and dried in vacuo to thereby obtain a novel modified phenolic resin containing an extremely small amount of an acid.

The modified phenolic resin was dissolved in a 10-fold weight of toluene, and insoluble matter was filtered off. The toluene solution of the resin was concentrated to a resin concentration of 50% by weight. Then, a small amount of triethylenetetramine was added thereto to effect neutralization. The resultant toluene solution was poured into a 3.3-fold weight of n-hexane to thereby precipitate the resin, and filtered. The precipitate was dried in vacuo, thereby obtaining 519 g of a novel modified phenolic resins from which the low molecular weight components were extracted and removed (Sample 9).

Moreover, as in Example 8, the content of low molecular weight components, the gelation time and the properties of a molding were measured. The results are shown in Table 5.

Example 12

A compound was prepared in the same manner as in Example 8, except that Sample 3 obtained in Example 8, Epicoat 828 (bisphenol A epoxy resin, produced by Yuka Shell Epoxy Co., Ltd.) and fused silica [CRS1102-RD8 (trade name), produced by Tatsumori Co., Ltd.] were employed as a modified phenolic resin, an epoxy resin and a filler, respectively, in accordance with the formulation indicated in Table 6. The compound was transfer molded under the molding conditions indicated in Table 7, and postcured under the postcure conditions indicated in Table 7, thereby obtaining a molding. The gelation time of the compound and the properties of the obtained molding were measured as in Example 8. The results are shown in Table 7.

Comparative Example 1

A compound was prepared in the same manner as in Example 12, except that the Sample A obtained in Example 8 was used in place of Sample 3 as a modified phenolic resin. The gelation time of the compound and the properties of an obtained molding were measured as in Example 12. The results are shown in Table 7.

Example 13

A compound was prepared in the same manner as in Example 8, except that Sample 9 obtained in Example 11, Epicoat 152 (phenol novolak epoxy resin, produced by Yuka Shell Epoxy Co., Ltd.) and fused silica [CRS1102-RD8 (trade name), produced by Tatsumori Co., Ltd.] were employed as a modified phenolic resin, an epoxy resin and a filler, respectively, in accordance with the formulation indicated in Table 6. The compound was transfer molded under the molding conditions indicated in Table 7, and postcured under the postcure conditions indicated in Table 7, thereby obtaining a molding. The gelation time of the compound and the properties of the obtained molding were measured as in Example 8. The results are shown in Table 7.

Comparative Example 2

A compound was prepared in the same manner as in Example 13, except that the Sample A obtained in Example 8 was used in place of Sample 9 as a modified phenolic resin. The gelation time of the compound and the properties of an obtained molding were measured as in Example 13. The results are shown in Table 7.

Example 14

A compound was prepared in the same manner as in Example 8, except that Sample 6 obtained in Example 9, Araldite MY-9512 (glycidylaminic tetrafunctional epoxy resin, produced by Nippon Ciba Geigy Co., Ltd.) and glass fiber (ES-30T, manufactured by Unitika UM Glass Co., Ltd.) were employed as a modified phenolic resin, an epoxy resin and a filler, respectively, in accordance with the formulation indicated in Table 6. The compound was transfer molded under the molding conditions indicated in Table 7, and postcured under the postcure conditions indicated in Table 7, thereby obtaining a molding. The gelation time of the compound and the properties of the obtained molding were measured as in Example 8. The results are shown in Table 7.

Comparative Example 3

A compound was prepared in the same manner as in Example 14, except that the Sample A obtained in Example 8 was used in place of Sample 6 as a modified phenolic resin. The gelation time of the compound and the properties of an obtained molding were measured as in Example 14. The results are shown in Table 7.

Example 15

A compound was prepared in the same manner as in Example 8, except that Sample 7 obtained in Example 10, Araldite MY-9512 (glycidylaminic tetrafunctional epoxy resin, produced by Nippon Ciba Geigy Co., Ltd.) and glass fiber (ES-30T, manufactured by Unitika UM Glass Co., Ltd.) were employed as a modified phenolic resin, an epoxy resin and a filler, respectively, in accordance with the formulation indicated in Table 6. The compound was transfer molded under the molding conditions indicated in Table 7, and postcured under the postcure conditions indicated in Table 7, thereby obtaining a molding. The gelation time of the compound and the properties of the obtained molding were measured as in Example 8. The results are shown in Table 7.

Comparative Example 4

A compound was prepared in the same manner as in Example 15, except that the Sample A obtained in Example 8 was used in place of Sample 7 as a modified phenolic resin. The gelation time of the compound and the properties of an obtained molding were measured as in Example 15. The results are shown in Table 7.

TABLE 6

| | Sample No. | Content of low molecular weight components (%) | Parts by weight of Sample or Comparative Sample Compounded | Epoxy resin Type of epoxy resin | Parts by weight of resin compounded |
|---|---|---|---|---|---|
| Comparative Example 1 | Sample A (Example 8) | 14.1 | 100 | E828*[1] | 80 |
| Example 12 | Sample 3 (Example 8) | 4.3 | 100 | E828 | 80 |
| Comparative Example 2 | Sample A (Example 8) | 14.1 | 100 | E152*[2] | 100 |
| Example 13 | Sample 9 (Example 11) | 7.5 | 100 | E152 | 100 |
| Comparative Example 3 | Sample A (Example ) | 14.1 | 100 | MY9512*[3] | 125 |
| Example 14 | Sample 6 (Example 9) | 7.7 | 100 | MY9512 | 125 |
| Comparative Example 4 | Sample A (Example ) | 14.1 | 100 | MY9512 | 66 |
| Example 15 | Sample 7 (Example 10) | 6.4 | 100 | MY9512 | 66 |

| | Sample No. | Filler Type of filler | Parts by weight of filler compounded | Parts by weight of curing agent 2E4MZ*[6] compounded | Parts by weight of carnauba wax as internal release agent compounded |
|---|---|---|---|---|---|
| Comparative Example 1 | Sample A (Example 8) | Fused silica*[4] | 555.5 | 3.67 | 1.48 |
| Example 12 | Sample 3 (Example 8) | Fused silica | 555.5 | 3.67 | 1.48 |
| Comparative Example 2 | Sample A (Example 8) | Fused silica | 381.2 | 4.08 | 1.17 |
| Example 13 | Sample 9 (Example 11) | Fused silica | 381.2 | 4.08 | 1.17 |
| Comparative Example 3 | Sample A (Example ) | GF*[5] | 230.5 | 4.59 | 0.92 |
| Example 14 | Sample 6 (Example 9) | GF | 230.5 | 4.59 | 0.92 |
| Comparative Example 4 | Sample A (Example ) | GF | 170.1 | 3.39 | 0.68 |
| Example 15 | Sample 7 (Example 10) | GF | 170.1 | 3.39 | 0.68 |

*[1]E828: Epicoat (trade name) 828 produced by Yuka Shell Epoxy Co., Ltd., Japan
*[2]E152: Epicoat (trade name) 152 produced by Yuka Shell Epoxy Co., Ltd., Japan
*[3]MY9512: Araldite (trade name) MY9512 produced by Ciba Geigy (Japan), Ltd., Japan
*[4]Fused silica: CRS1102-RD8 produced by Tatsumori Co., Ltd., Japan
*[5]GF: Fiber ES-30T produced by Unitika UM Glass Co., Ltd., Japan
*[6]2E4MZ: 2-Ethyl-4-methylimidazole (Reagent 1st Grade) produced by Wako Pure Chemical Industries, Ltd., Japan

TABLE 7

| | Sample No. | Molding conditions Temp. (°C.) | Time (sec) | Postcure conditions Temp. (°C.) | Time (hr) | Gelation conditions 170° C. (sec) | Properties of molding Glass transition temp. (°C.) | Linear expansion coefficient ($10^{-5}$/°C.) |
|---|---|---|---|---|---|---|---|---|
| Comparative | Sample A | 175 | 90 | 200 | 12 | 78 | 147 | 2.01 |

TABLE 7-continued

| | | Molding conditions | | Postcure conditions | | Gelation conditions | Glass transition | Linear expansion coefficient |
|---|---|---|---|---|---|---|---|---|
| | Sample No. | Temp. (°C.) | Time (sec) | Temp. (°C.) | Time (hr) | 170° C. (sec) | temp. (°C.) | ($10^{-5}$/ °C.) |
| Example 1 | (Example 8) | | | | | | | |
| Example 12 | Sample 3 (Example 8) | 175 | 90 | 200 | 12 | 57 | 161 | 1.76 |
| Comparative Example 2 | Sample A (Example 8) | 175 | 90 | 175 | 6 | 67 | 139 | 3.39 |
| Example 13 | Sample 9 (Example 11) | 175 | 90 | 175 | 6 | 43 | 145 | 2.54 |
| Comparative Example 3 | Sample A (Example 8) | 175 | 90 | 175 | 6 | 72 | 175 | 3.73 |
| Example 14 | Sample 6 (Example 9) | 175 | 90 | 175 | 6 | 47 | 186 | 3.43 |
| Comparative Example 4 | Sample A (Example 8) | 175 | 90 | 175 | 6 | 60 | 179 | 4.38 |
| Example 15 | Sample 7 (Example 10) | 175 | 90 | 175 | 6 | 47 | 191 | 2.98 |

What is claimed is:

1. A molding material based on a modified phenolic resin, comprising the modified phenolic resin (A), an epoxy resin (B) and a curing agent (C), said modified phenolic resin (A) being a modified phenolic resin containing substantially no acid and being prepared by:

heating under agitation a mixture comprising a petroleum heavy oil or petroleum pitch and a formaldehyde polymer in a ratio of the number of moles, in terms of formaldehyde, of the formaldehyde polymer to that of the petroleum heavy oil or pitch of 1:1 to 15:1 in the presence of an acid catalyst, gradually adding a phenol to the mixture while heating under agitation until a ratio of the number of moles of the phenol to that of the petroleum heavy oil or pitch is 0.5:1 to 5:1 to thereby effect a polycondensation of the petroleum heavy oil or pitch, the formaldehyde polymer and the phenol, to obtain a crude modified phenolic resin, and subjecting said crude modified phenolic resin to purification treatments, performed in optional sequence, of:

(i) treating said crude modified phenolic resin with a solvent selected from the group consisting of aliphatic and alicyclic hydrocarbons of up to 10 carbon atoms sufficiently to remove solvent-soluble components including unreacted components and to precipitate a modified phenolic resin, and (ii) extracting said crude modified phenolic resin with an aromatic hydrocarbon solvent capable of dissolving most of said modified phenolic resin but in which said catalyst has a solubility of 0.1 or less, and removing catalyst residue.

2. The molding material as claimed in claim 1, wherein a weight ratio of the modified phenolic resin (A) to the epoxy resin (B) is 10/90 to 90/10.

3. The molding material as claimed in claim 1, which further comprises an inorganic filler (D).

4. A material for electrical or electronic part produced by molding the molding material as claimed in claim 1.

5. The material for electrical or electronic part as claimed in claim 4, which further comprises an inorganic filler (D).

6. A semiconductor sealer comprising the molding material as claimed in claim 1.

7. The semiconductor sealer as claimed in claim 6, which further comprises an inorganic filler (D).

8. A molding material based on a modified phenolic resin, comprising a modified phenolic resin (A') containing substantially no acid and having a content of low molecular weight components, each of which has a molecular weight of 600 or less in terms of polystyrene, of 10% or less, an epoxy resin (B) and a curing agent (C), said modified phenolic resin being obtained by:

reacting a mixture comprising a petroleum heavy oil or pitch, a formaldehyde polymer in a ratio of the number of moles, in terms of formaldehyde, of the formaldehyde polymer to that of the petroleum heavy oil or pitch of 1:1 to 15:1, and a phenol in the presence of an acid catalyst to effect a polymerization, to obtain a crude modified phenolic resin, and subjecting said crude modified phenolic resin to purification treatments, performed in optional sequence, of:

(i) treating said crude modified phenolic resin with a solvent selected from the group consisting of aliphatic and alicyclic hydrocarbons of up to 10 carbon atoms sufficiently to remove solvent-soluble components including unreacted components and to precipitate a modified phenolic resin, (ii) extracting said crude modified phenolic resin with an aromatic hydrocarbon solvent capable of dissolving most of said modified phenolic resin but in which said catalyst has a solubility of 0.1 or less, and removing catalyst residue, and (iii) treating the crude modified phenolic resin with a mixed solvent which is a mixture of an aromatic hydrocarbon and either an aliphatic hydrocarbon or an alcohol to thereby remove solvent-soluble components including unreacted components and low molecular weight components.

9. The molding material as claimed in claim 8, which further comprises an inorganic filler (D).

10. A material for electrical or electronic part produced by molding the molding material as claimed in claim 8.

11. The material for electrical or electronic part as claimed in claim 10, which further comprises an inorganic filler (D).

12. A semiconductor sealer comprising the molding material as claimed in claim 8.

13. The semiconductor sealer as claimed in claim 12, which further comprises an inorganic filler (D).

* * * * *